US012671268B2

(12) United States Patent
Liu et al.

(10) Patent No.: US 12,671,268 B2
(45) Date of Patent: Jun. 30, 2026

(54) AERIAL VEHICLES, CHARGING STATIONS AND CHARGING SYSTEMS

(71) Applicant: TOYOTA MOTOR ENGINEERING & MANUFACTURING NORTH AMERICA, INC., Plano, TX (US)

(72) Inventors: Yanghe Liu, Ann Arbor, MI (US); Shailesh N. Joshi, Ann Arbor, MI (US); Hiroshi Ukegawa, South Lyon, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1101 days.

(21) Appl. No.: 17/710,405

(22) Filed: Mar. 31, 2022

(65) Prior Publication Data

US 2023/0318356 A1      Oct. 5, 2023

(51) Int. Cl.
| | |
|---|---|
| *H02J 50/10* | (2016.01) |
| *B60L 53/126* | (2019.01) |
| *B60L 53/38* | (2019.01) |
| *H02N 15/00* | (2006.01) |

(52) U.S. Cl.
CPC ............ *H02J 50/10* (2016.02); *B60L 53/126* (2019.02); *B60L 53/38* (2019.02); *H02N 15/00* (2013.01); *B60L 2200/10* (2013.01)

(58) Field of Classification Search
CPC ........ H02J 50/10; B60L 53/126; B60L 53/38; B60L 2200/10; B60L 53/62; B60L 53/32; H02N 15/00; B64U 50/35; B64U 50/37
See application file for complete search history.

(56) References Cited

U.S. PATENT DOCUMENTS

| | | | | |
|---|---|---|---|---|
| 3,927,620 | A | * 12/1975 | Clapham | ................. B60L 13/10 |
| | | | | 104/282 |
| 9,975,634 | B2 | 5/2018 | Von Novak, III et al. | |
| 2016/0373166 | A1 | * 12/2016 | Yang | ................. H04W 52/0235 |
| 2017/0038778 | A1 | * 2/2017 | Wang | ........................ B64F 1/02 |
| 2017/0240061 | A1 | * 8/2017 | Waters | .................. B60L 53/126 |

FOREIGN PATENT DOCUMENTS

| | | | | |
|---|---|---|---|---|
| CN | 107516923 | A | * 12/2017 | ............ H02J 7/0047 |
| CN | 110518708 | A | * 11/2019 | |
| CN | 111137470 | A | * 5/2020 | |
| KR | 102172223 | B1 | 10/2020 | |
| KR | 20210059819 | A | 5/2021 | |
| WO | WO-2016172962 | A1 | * 11/2016 | ........... B64C 25/001 |
| WO | 2019084796 | A1 | 5/2019 | |
| WO | WO-2021236088 | A1 | * 11/2021 | ............. H02J 50/80 |

* cited by examiner

*Primary Examiner* — Drew A Dunn
(74) *Attorney, Agent, or Firm* — Dinsmore & Shohl LLP

(57) ABSTRACT

An aerial vehicle is provided. The aerial vehicle may include a battery, a receiver for wirelessly receiving power to charge the battery, a vehicle magnetic levitation module providing a repelling force between the aerial vehicle and a charging station, and a controller controlling the vehicle magnetic levitation module to adjust a level of the repelling force based on at least one of parameters indicative of charging efficiency.

14 Claims, 6 Drawing Sheets

AERIAL VEHICLES, CHARGING STATIONS AND CHARGING SYSTEMS

TECHNICAL FIELD

The embodiments described herein generally relate to a charging system for charging aerial vehicles, and in particular, to the charging system utilizing a magnetic levitation module.

BACKGROUND

An electric aerial vehicle may be charged wirelessly through a charging station. Efficiency of wireless charging may depend on a distance between the aerial vehicle and the charging station. Therefore, it is preferable to maintain a certain distance between the aerial vehicle and the charging station while charging the aerial vehicle such that to provide optimal charging efficiency or a certain level of charging efficiency.

Accordingly, a need exists for charging systems that maintain a predetermined distance between the aerial vehicle and the charging station while charging the aerial vehicle.

SUMMARY

In one embodiment, an aerial vehicle is provided. The aerial vehicle includes a battery that is chargeable, a receiver wirelessly receiving power to charge the battery, a vehicle magnetic levitation module providing a repelling force between the aerial vehicle and a charging station, and a controller controlling the vehicle magnetic levitation module to adjust a level of the repelling force based on at least one of parameters indicative of charging efficiency.

In another embodiment, a charging station for charging an aerial vehicle is provided. The charging station includes a transmitter wirelessly transmitting power to the aerial vehicle, a transmitter magnetic levitation module providing a repelling force between the aerial vehicle and the charging station, and a controller controlling the transmitter magnetic levitation module to adjust a level of the repelling force based on at least one of parameters indicative of charging efficiency.

In yet another embodiment, a system for charging an aerial vehicle is provided. The aerial vehicle includes a battery that is chargeable, and a receiver wirelessly receiving power to charge the battery. A charging station includes a transmitter for wirelessly transmitting power to the receiver. A magnetic levitation module provides a repelling force between the aerial vehicle and the charging station. A controller controls the magnetic levitation module to adjust a level of the repelling force based on at least one of parameters indicative of charging efficiency.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Electric aerial vehicles may be charged wirelessly through a charging station. Efficiency of wireless charging may depend on a distance between an aerial vehicle and the charging station. The charging efficiency is correlated to the distance between the aerial vehicle and the charging station. Therefore, it is preferable to maintain the distance between the aerial vehicle and the charging station such that to provide optimal charging efficiency or a certain level of charging efficiency. The distance may be maintained by utilizing a magnetic levitation module to provide repelling force between the aerial vehicle and the charging station. By maintaining the distance between the aerial vehicle and the charging station, a certain level of charging efficiency may be maintained and the aerial vehicle may be positioned for the best charging efficiency.

Various embodiments described herein provide a charging system of an electric aerial vehicle (e.g., eVTOL vehicle) that utilizes a magnetic levitation module and a controller to control one or both of the aerial vehicle and the charging station to maintain the distance between them.

Figure 1:
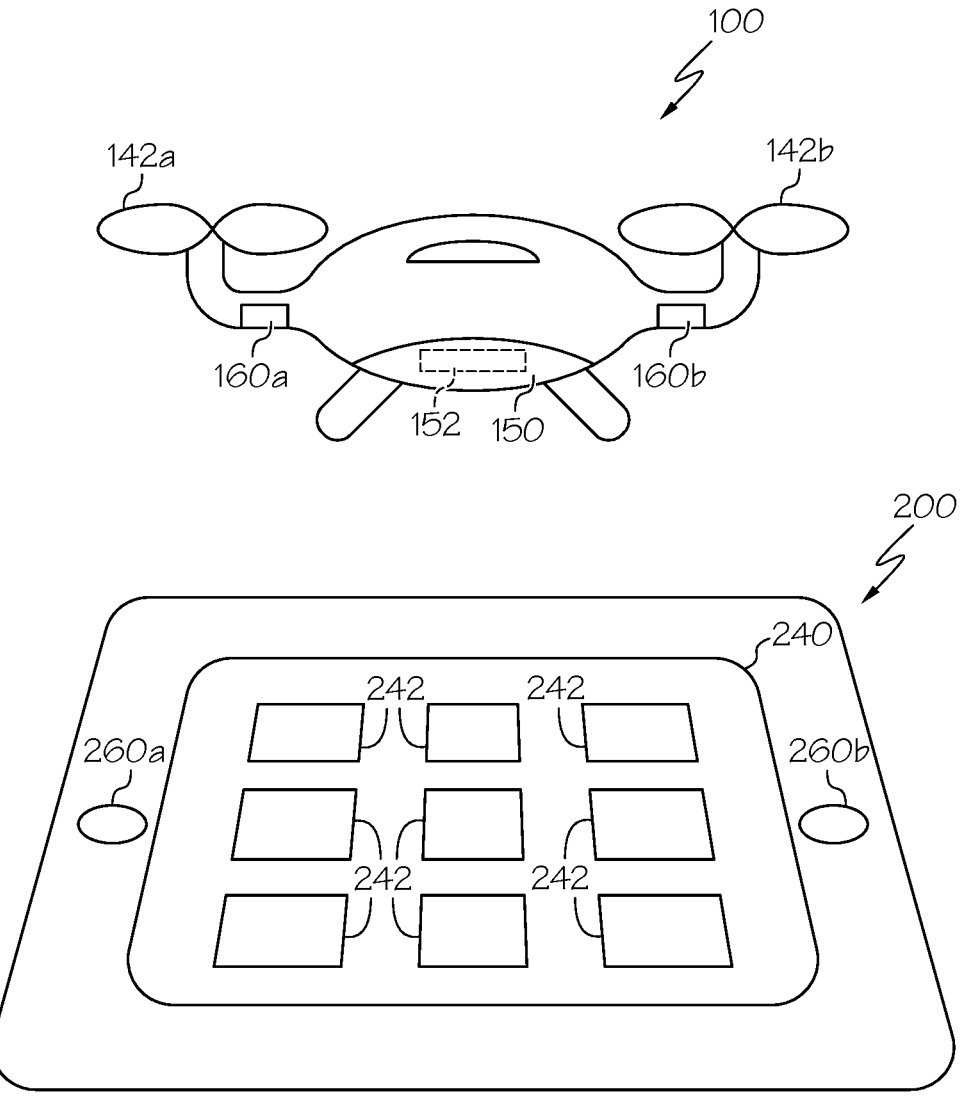
FIG. 1 schematically depicts a charging system including an aerial vehicle and a charging station of an exemplary embodiment, according to one or more embodiments described and illustrated herein.

FIG. 1 depicts an example implementation of a charging system including an aerial vehicle 100 and a charging station 200. The aerial vehicle 100 is capable of traveling in the air, or on land, using primarily or exclusively electric power. As a non-limiting example, the aerial vehicle 100 may have propellers 142a, 142b positioned on wings that protrude from the side portions of the aerial vehicle 100. The aerial vehicle may have an electric motor assembly 144 (FIG. 2) that may be coupled to the propellers 142a, 142b such that to rotate the propellers 142a, 142b. In embodiments, the aerial vehicle 100 may include a receiver 150 that may receive power to charge a battery 152 to supply electricity to the electronic components of the aerial vehicle 100. The receiver 150, as a non-limiting example, may be disposed on the bottom portion of the aerial vehicle 100. The location of the receiver 150 may depend on the location of the charging station 200 with respect to the aerial vehicle 100 or the center of the gravity of the aerial vehicle 100 for a weight balance. The location of the battery 152 may similarly depend on the respective location of the charging station 200 and/or the center of the gravity of the aerial vehicle 100.

The aerial vehicle 100 may further include magnetic levitation modules 160a, 160b. The magnetic levitation modules 160a, 160b may be configured to provide and/or receive repelling force between the aerial vehicle 100 and the charging station 200. The magnetic levitation modules 160a, 160b, as a non-limiting example, may be disposed on the body of the aerial vehicle 100 facing the bottom of the aerial vehicle 100. Each of the magnetic levitation modules 160a, 160b may be disposed on the wings by which the propellers 142a, 142b are coupled to the body of the aerial vehicle 100. The number of magnetic levitation modules 160a, 160b may be reduced to one or increased to three or more depending on the size and/or weight of the aerial vehicle 100 and desired repelling force. For example, each of the magnetic levitation modules 160a, 160b may be disposed at opposite ends of the aerial vehicle 100. Linear configuration (e.g., two point configuration) of the magnetic levitation modules 160a, 160b may provide 2 dimensional balance to the aerial vehicle 100 by providing repelling force.

Still referring to FIG. 1, the charging station 200 may include a transmitter 240 including charging elements 242. The transmitter 240 may transmit power to the receiver 150 of the aerial vehicle 100 wirelessly. Each charging elements 242 may have electromagnetic coils (e.g., copper coils) to inductively transmit power to the receiver 150. The charging station 200 may be coupled to an AC power to supply power. The charging station 200 may further include magnetic levitation modules 260a, 260b. The magnetic levitation modules 260a, 260b may be disposed at opposite ends of the charging station 200. The location of the magnetic levitation modules 260a, 260b may correspond to the location of the magnetic levitation modules 160a, 160b. The distance between the magnetic levitation modules 260a, 260b may be the same as the distance between the magnetic levitation modules 160a, 160b. For example, the magnetic levitation modules 260a, 260b and the magnetic levitation modules 160a, 160b may be vertically aligned to face each other, such that the location of the magnetic levitation modules 260a, 260b and the magnetic levitation modules 160a, 160b at least partially overlap when viewed from above (e.g., from the top of the aerial vehicle 100).

In some embodiments, one of a pair of the magnetic levitation modules 260a, 260b and a pair of the magnetic levitation modules 160a, 160b may be replaced with a pair of magnets instead of both pairs being the magnetic levitation modules. The magnetic levitation modules 260a, 260b may not be disposed within the transmitter 240 to avoid interference with power transmission for charging the aerial vehicle 100. Thus, disposing the magnetic levitation modules 260a, 260b outside of the transmitter 240 may help efficient charging. The shape of the charging station 200 is not limited to square, but could be various shapes including, triangle, circle, pentagon, or the like.

Figure 2:
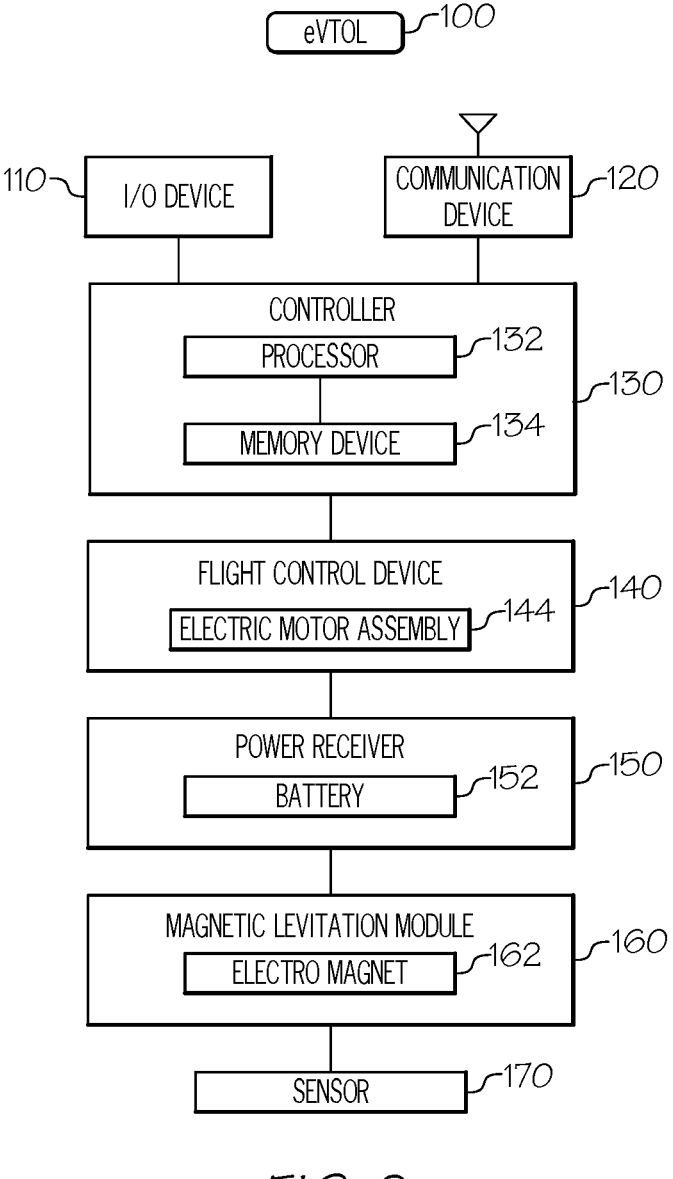
FIG. 2 depicts a block diagram showing a configuration of the aerial vehicle illustrated in FIG. 1, according to one or more embodiments described and illustrated herein.

FIG. 2 is a block diagram showing a configuration example of the aerial vehicle 100 (e.g., eVTOL) according to some embodiments. The aerial vehicle 100 may include an input/output device 110, a communication device 120, a controller 130, a flight control device 140, a receiver 150, and a magnetic levitation module 160.

The input/output device 110 may be an interface for receiving information or instruction from a user of the aerial vehicle 100 and for providing information to the user. Examples of the input device may include a keyboard, a mouse, a touch panel, a switch, a microphone, and the like. The output device may include, for example, a display, a speaker, and the like.

The communication device 120 may be configured to communicate with the outside. For example, the communication device 120 may wirelessly communicate or perform near field communication with the charging station 200 or the user via a user device. The communication device 120 may communicate with the outside via satellite communication or dedicated line.

The controller 130 may process a variety of information. For example, the controller 130 may include one or more processors 132 and one or more memory devices 134. The processor 132 may include a Central Processing Unit (CPU). The memory device 134 may store a variety of information necessary for the processor 132. For example, the memory device 134 may include a volatile memory, a non-volatile memory, a Hard Disk Drive (HDD), and Solid State Drive (SSD), and the like. The controller 130 may execute a computer program by using the processor 132. The computer program may be stored in the memory device 134. The computer program may be recorded on a computer readable recording medium. The computer program may be provided via a network. It is noted that the controller 130 may control all the components of the aerial vehicle 100 in some embodiments.

The flight control device 140 may control the flight of the aerial vehicle 100 by controlling the electric motor assembly 144 coupled to the propellers (e.g., 142a, 142b in FIG. 1) using the power supplied from a battery 152.

The receiver 150 may receive power from the outside to charge the battery 152. The battery 152 may supply power to the electric motor assembly 144, and other electronic components of the aerial vehicle 100. The battery 152 may be a storage battery which is rechargeable, such as a solid state battery, a fuel cell, or any battery that is wirelessly chargeable through the receiver 150.

The magnetic levitation module 160 (e.g., 160a, 160b in FIG. 1) may be configured to generate a magnetic field that may generate repulsive force sufficient to lift or repel the aerial vehicle 100 away from the charging station 200. The magnetic levitation module 160 may include one or more electro magnets 162. The magnetic levitation module 160 may increase or decrease the power of the magnetic field generated by the electro magnet 162.

The aerial vehicle 100 may have a sensor 170 that senses the distance between the aerial vehicle 100 and the charging station 200 or the position of the aerial vehicle 100 with respect to the charging station 200. In some embodiments, the sensor 170 may be a positioning sensor or a misalignment sensor. In other embodiments, the sensor 170 may sense the current changes of the magnetic levitation module 160. For example, the sensor 170 may sense current changes and provide feedback to the controller 130 to control the flight control device 140 to change the position or the location of the aerial vehicle 100 and/or to control the magnetic levitation module 160 to change the power of the magnetic field.

Figure 3:
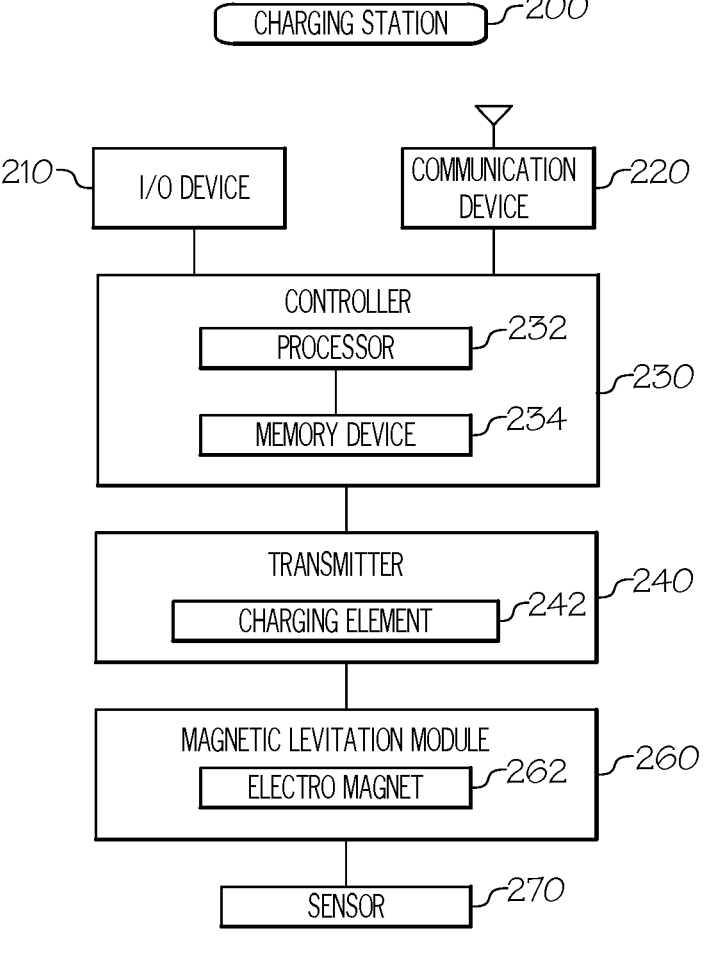
FIG. 3 depicts a block diagram showing a configuration of the charging station illustrated in FIG. 1, according to one or more embodiments described and illustrated herein.

FIG. 3 is a block diagram showing a configuration example of the charging station 200 according to some embodiments. The charging station 200 may include an input/output device 210, a communication device 220, a controller 230, the transmitter 240, a magnetic levitation module 260 (e.g., magnetic levitation modules 260a, 260b in FIG. 1), and a sensor 270.

The input/output device 210 may be an interface for receiving information or instruction from a user of the charging station 200 and for providing information to the user. Examples of the input device may include a keyboard, a mouse, a touch panel, a switch, a microphone, and the like. The output device may include, for example, a display, a speaker, and the like.

The communication device 220 may be configured to communicate with the outside. For example, the communication device 220 may wirelessly communicate or perform near field communication with the aerial vehicle 100 or the user via a user device. The communication device 220 may communicate with the outside via satellite communication or dedicated line.

The controller 230 may process a variety of information. For example, the controller 230 may include one or more processors 232 and one or more memory devices 234. The processor 232 may include a CPU. The memory device 234 may store a variety of information necessary for the processor 232. For example, the memory device 234 may include a volatile memory, a non-volatile memory, a HDD, a SSD, and the like. The controller 230 may execute a computer program by using the processor 232. The computer program may be stored in the memory device 234. that computer program may be recorded on a computer readable recording medium. The computer program may be provided via a network. It is noted that the controller 230 may control all the components of the charging station 200 in some embodiments.

The transmitter 240 may transmit power to the receiver 150. The transmitter 240 may include one or more charging elements 242 such as inductive charging elements. The charging elements 242 may be attached to and/or wholly or partially embedded with the transmitter 240. The charging elements 242 may produce a magnetic field to transmit the power to the receiver 150 to charge the battery 152 of the aerial vehicle 100.

The magnetic levitation module 260 (e.g., 260a, 260b in FIG. 1) may be configured to generate a magnetic field that may generate repulsive force sufficient to lift or repel the aerial vehicle 100 away from the charging station 200. The magnetic levitation module 260 may include one or more electro magnets 262. The magnetic levitation module 260 may increase or decrease the power of the magnetic field generated by the electro magnet 262.

The charging station 200 may have a sensor 270 that senses the distance between the aerial vehicle 100 and the charging station 200 or the position of the aerial vehicle 100 with respect to the charging station 200. In some embodiments, the sensor 270 may be a positioning sensor or a misalignment sensor. In other embodiments, the sensor 270 may sense the current changes of the magnetic levitation module 260. The sensor 270 may sense current changes and provide feedback to the controller 230 to control the magnetic levitation module 260 to change the power of the magnetic field.

Figure 4:
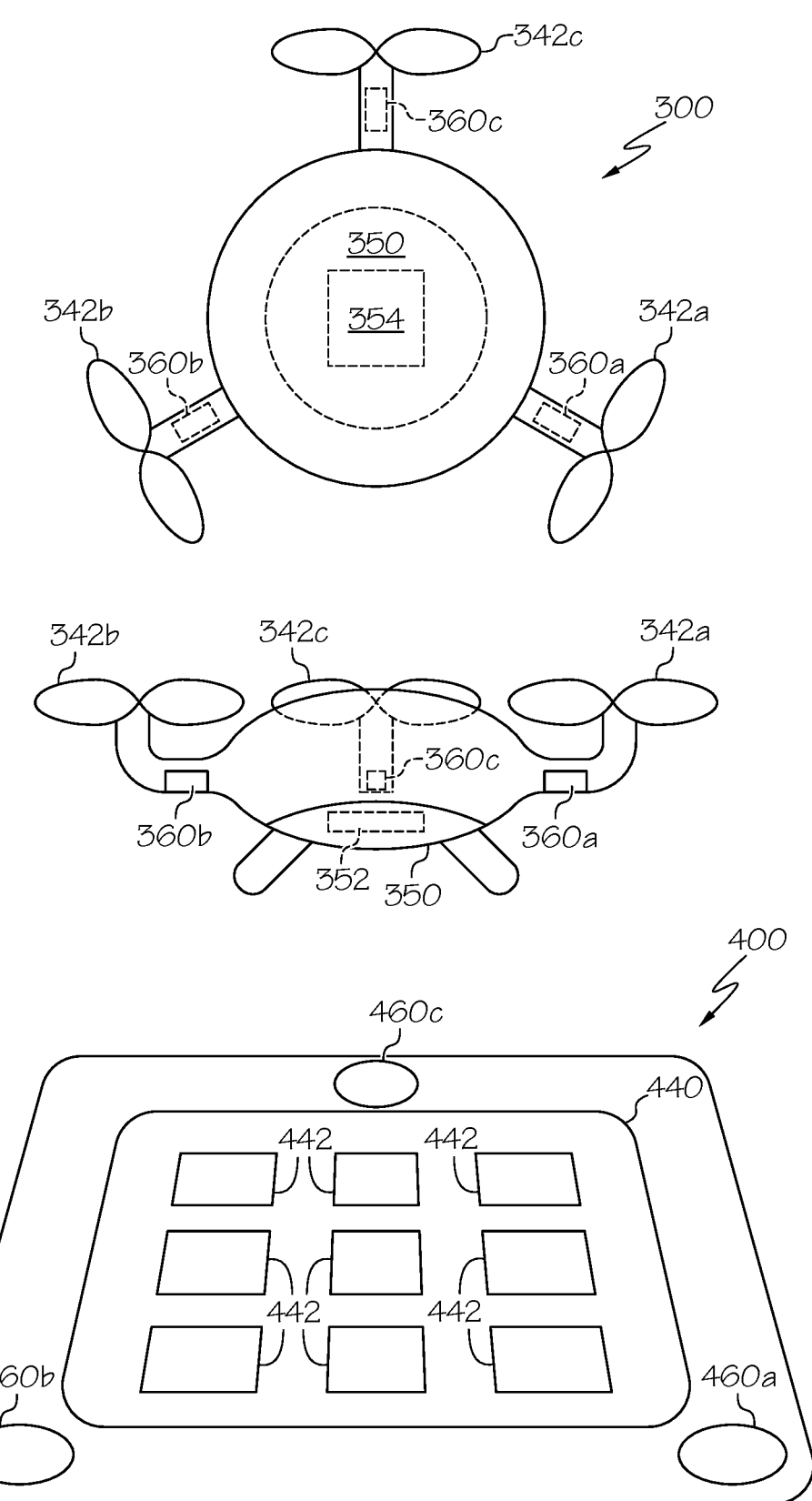
FIG. 4 schematically depicts a charging system including an aerial vehicle and a charging station of another exemplary embodiment, according to one or more embodiments described and illustrated herein.

FIG. 4, depicts another example implementation of a charging system including an aerial vehicle 300 (e.g., eVTOL) and a charging station 400. The aerial vehicle 300 may have three magnetic levitation modules 360a, 360b, 360c, in some embodiments. The aerial vehicle 300 may be generally the same with the aerial vehicle 200 (FIG. 1) unless stated otherwise herein. Further, the charging station 400 may have three magnetic levitation modules 460a, 460b, 460c, in some embodiments.

The aerial vehicle 300 may have propellers 342a, 342b, 342c on wings protrude from the side portions of the aerial vehicle 300. The aerial vehicle may have an electric motor assembly 144 (FIG. 2) that may be coupled to the propellers 342a, 342b, 342c. In embodiments, the aerial vehicle 300 may include a receiver 350 that may receive power to charge a battery 352 to supply electricity to the electronic components of the aerial vehicle 300. The receiver 350, as a non-limiting example, may be disposed on the bottom portion of the aerial vehicle 300. The location of the receiver 350 may depend on the location of the charging station 400 with respect to the aerial vehicle 300 or the center of the gravity of the aerial vehicle 300 for a weight balance. The location of the battery 352 may similarly depend on the respective location of the charging station 400 and/or the center of the gravity of the aerial vehicle 300.

The aerial vehicle 300 may further include the magnetic levitation modules 360a, 360b, 360c. The magnetic levitation modules 360a, 360b, 360c may be configured to provide repelling force between the aerial vehicle 300 and the charging station 400. The magnetic levitation modules 360a, 360b, 360c, as a non-limiting example, may be disposed on the body of the aerial vehicle 300 facing the bottom of the aerial vehicle 300. For example, each of the magnetic levitation modules 360a, 360b, 360c may be disposed at positions equally spaced apart from each other. The magnetic levitation modules 360a, 360b, 360c may be disposed on the wings by which the propellers 342a, 342b, 342c are coupled to the body of the aerial vehicle 300. When viewed from above (e.g., from the top of the aerial vehicle 300), the magnetic levitation modules 360a, 360b, 360c may form a triangular shape when connected with imaginary lines. The triangular configuration of the magnetic levitation modules 360a, 360b, 360c may provide 3 dimensional balance to the aerial vehicle 300 by providing repelling force.

Still referring to FIG. 4, the charging station 400 may include a transmitter 440 including charging elements 442. The transmitter 440 may transmit power to the receiver 350 of the aerial vehicle 300 wirelessly. Each charging elements 442 may have electromagnetic coils (e.g., copper coils) to inductively transmit power to the receiver 450. The charging station 400 may be coupled to an AC power to supply power. The charging station 400 may further include magnetic levitation modules 460a, 460b, 460c. The magnetic levitation modules 460a, 460b, 460c may be disposed at side portions of the charging station 400. The location of the magnetic levitation modules 460a, 460b, 460c may correspond to the location of the magnetic levitation modules 360a, 360b, 360c. The distances between the magnetic levitation modules 460a, 460b, 460c may be the same as the distances between the magnetic levitation modules 360a, 360b, 360c. For example, the magnetic levitation modules 460a, 460b, 460c and the magnetic levitation modules 360a, 360b, 360c may be vertically aligned to face each other, such that the location of the magnetic levitation modules 360a, 360b, 360c and the magnetic levitation modules 460a, 460b, 460c at least partially overlap when viewed from above (e.g., from the top of the aerial vehicle 300). The magnetic levitation modules 460a, 460b, 460c may be disposed to form a triangular shape when connected with imaginary lines, which may be the same as the triangular shape of the magnetic levitation modules 360a, 360b, 360c.

In some embodiments, one of a group of the magnetic levitation modules 360a, 360b, 360c and a group of the magnetic levitation modules 460a, 460b, 460c may be replaced with a group of magnets instead of both groups being the magnetic levitation modules. The magnetic levitation modules 460a, 460b, 460c may not be disposed within the transmitter 440 to avoid interference with power transmission for charging the aerial vehicle 300. Thus, disposing the magnetic levitation modules 460*a*, 460*b*, 460*c* outside of the transmitter 440 may help efficient charging. The shape of the charging station 400 is not limited to square, but could be various shapes including, triangle, circle, pentagon, or the like.

Figure 5A:
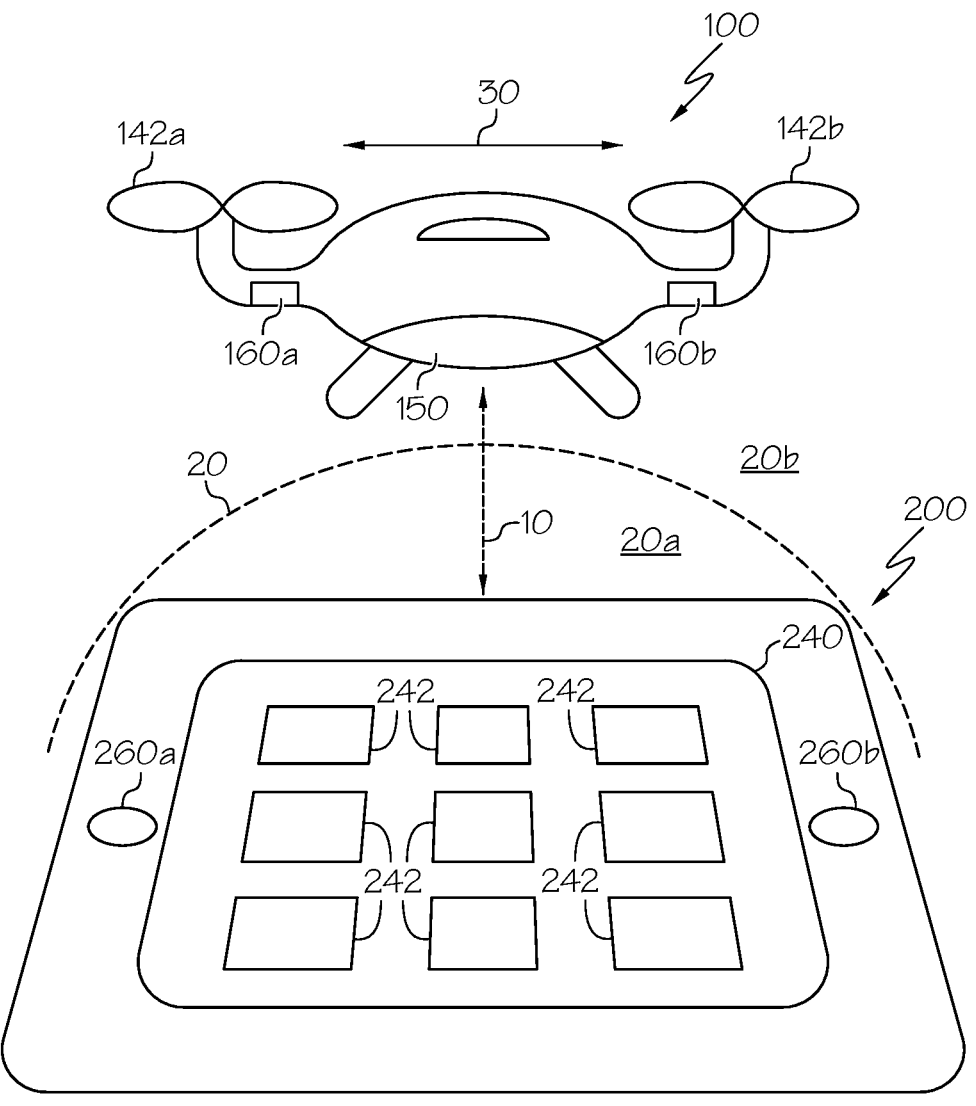
FIG. 5A schematically depicts a relative distance between the aerial vehicle and the power transmitter of FIG. 1, according to one or more embodiments described and illustrated herein.

Referring to FIG. 5A, the charging system of FIG. 1 including the aerial vehicle 100 and the charging station 200 may maintain a target distance 20 between the aerial vehicle 100 and the charging station 200 by utilizing magnetic levitation modules 160*a*, 160*b* and/or the magnetic levitation modules 260*a*, 260*b*. When the aerial vehicle 100 stays at the position along the target distance 20, charging efficiency is maintained at a targeted level. The target distance 20 may be set to an optimal distance where the charging efficiency is optimal. The distances between the aerial vehicle 100 and the charging station 200 may be changed based on the feedback from the sensor 170 and/or the sensor 270. As described above, the sensors 170, 270 may sense current levels of the magnetic levitation modules 160, 260, which may indicate the distance between the aerial vehicle 100 and the charging station 200. The sensors 170, 270 may directly sense the actual distance between the aerial vehicle 100 and the charging station 200 or indirectly sense the distance between the aerial vehicle 100 and the charging station 200. For example, increase in current may indicate the aerial vehicle 100 is approaching the charging station 200, and decrease in current may indicate the aerial vehicle 100 is moving away from the charging station 200. Therefore, the controllers 130, 230 may determine whether the aerial vehicle 100 is in an over coupling zone 20*a*, which is the area closer to the charging station 200 than the target distance 20, when the current is higher than a predetermined value. In contrast, the controller 130, 230 may determine whether the aerial vehicle 100 is in an insufficient coupling zone 20*b*, which is the area farther from the charging station 200 than the target distance 20, when the current is lower than the predetermined value.

Accordingly, based on the feedback from the sensor 170, the controller 130 may control the magnetic levitation module 160 (e.g., 160*a*, 160*b*) to change the power of the magnetic field generated by the electro magnet 162 to change the distance between the aerial vehicle 100 and the transmitter 440 in a vertical direction 10 and a lateral direction 30. For example, when the aerial vehicle 100 is determined to be in the over coupling zone 20*a*, the controller 130 may increase the power of the magnetic field to increase repulsive force between the aerial vehicle 100 and the charging station 200 so that to increase the relative distance between the aerial vehicle 100 and the charging station 200. The controller 130 may increase the power of the magnetic field enough to move the aerial vehicle away from the charging station 200 to maintain the target distance 20.

In contrast, when the aerial vehicle 100 is determined to be in the insufficient coupling zone 20*b*, the controller 130 may decrease the power of the magnetic field to decrease repulsive force between the aerial vehicle 100 and the charging station 200 so that to decrease the relative distance between the aerial vehicle 100 and the charging station 200. The controller 130 may decrease the power of the magnetic field enough to move the aerial vehicle 100 to approach the charging station 200 and to maintain the target distance 20.

Additionally, based on the feedback from the sensor 170, the controller 130 may control the flight control device 140 to change the rotation speed of propellers 142*a*, 142*b* to move the aerial vehicle 100 in the vertical direction 10 and the lateral direction 30 to increase and decrease the relative distance between the aerial vehicle 100 and the charging station 200. For example, when the aerial vehicle 100 is determined to be in the over coupling zone 20*a*, the controller 130 may increase the rotation speed of the propellers 142*a*, 142*b* to move the aerial vehicle 100 away from the charging station 200. The controller 130 may adjust the rotation speed enough to move the aerial vehicle 100 to maintain the target distance 20 between the aerial vehicle 100 and the charging station 200.

In contrast, when the aerial vehicle 100 is determined to be in the insufficient coupling zone 20*b*, the controller 130 may decrease the rotation speed of the propellers 142*a*, 142*b* to move the aerial vehicle 100 to approach the charging station 200. The controller 130 may adjust the rotation speed enough to move the aerial vehicle 100 to maintain the target distance 20 between the aerial vehicle 100 and the charging station 200.

It is noted that the controller 130 may control only the magnetic levitation module 160 or both of the magnetic levitation module 160 and the flight control device 140 to maintain the target distance 20 between the aerial vehicle 100 and the charging station 200.

Figure 5B:
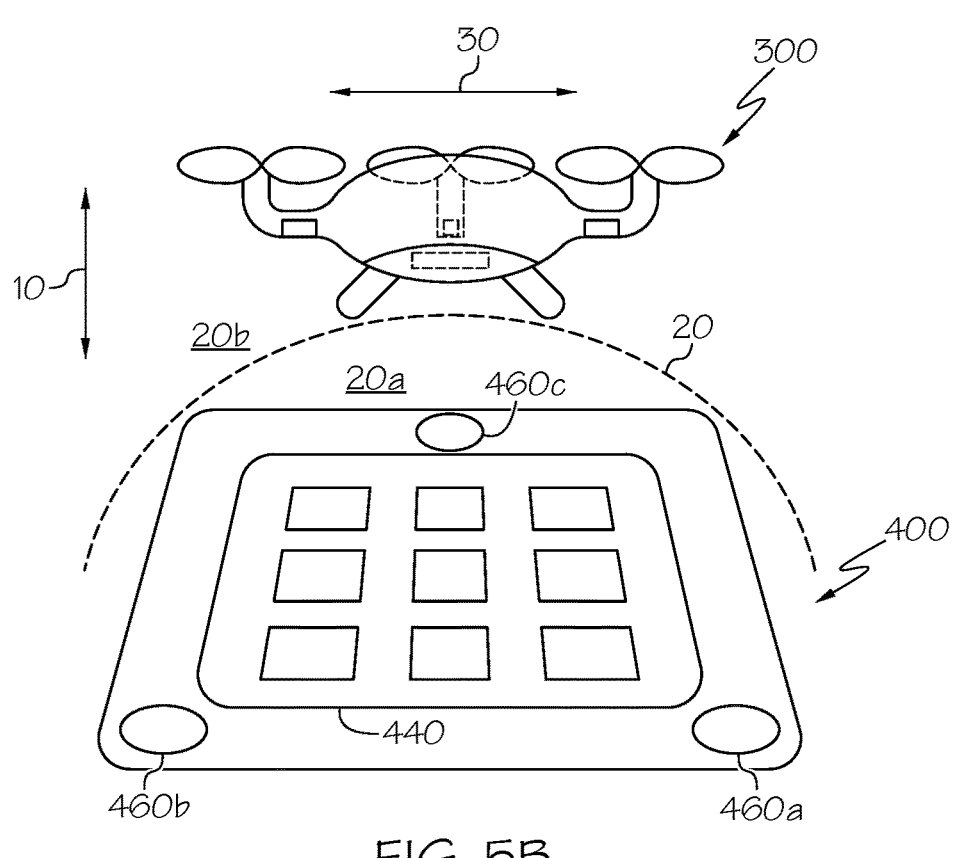
FIG. 5B schematically depicts a relative distance between the aerial vehicle and the power transmitter of FIG. 4, according to one or more embodiments described and illustrated herein.

Referring to FIG. 5B, the charging system of FIG. 4 including the aerial vehicle 300 and the charging station 400 may maintain the target distance 20 between the aerial vehicle 300 and the charging station 400. Similar to the charging system of FIG. 1, the aerial vehicle 300 may be moved in the vertical direction 10 and the lateral direction 30 to maintain the target distance 20. With three magnetic levitation modules 360*a*, 360*b*, 360*c*, the charging system of FIG. 4 may generate a magnetic force depression such that charging stability of the aerial vehicle 300 may be improved. The magnetic force depression is generated by three or more magnetic fields having a maximum magnetic force near the perimeter or ends of the aerial vehicle 100. A minimum magnetic force is generated near a center of the aerial vehicle 100. This magnetic force depression provides lateral stability for the aerial vehicle 100 because it is difficult for the aerial vehicle 100 to move laterally due to the magnetic force depression. Thus, the three magnetic levitation modules 360*a*, 360*b*, and 360*c* may provide alignment in three dimensions.

Figure 5C:
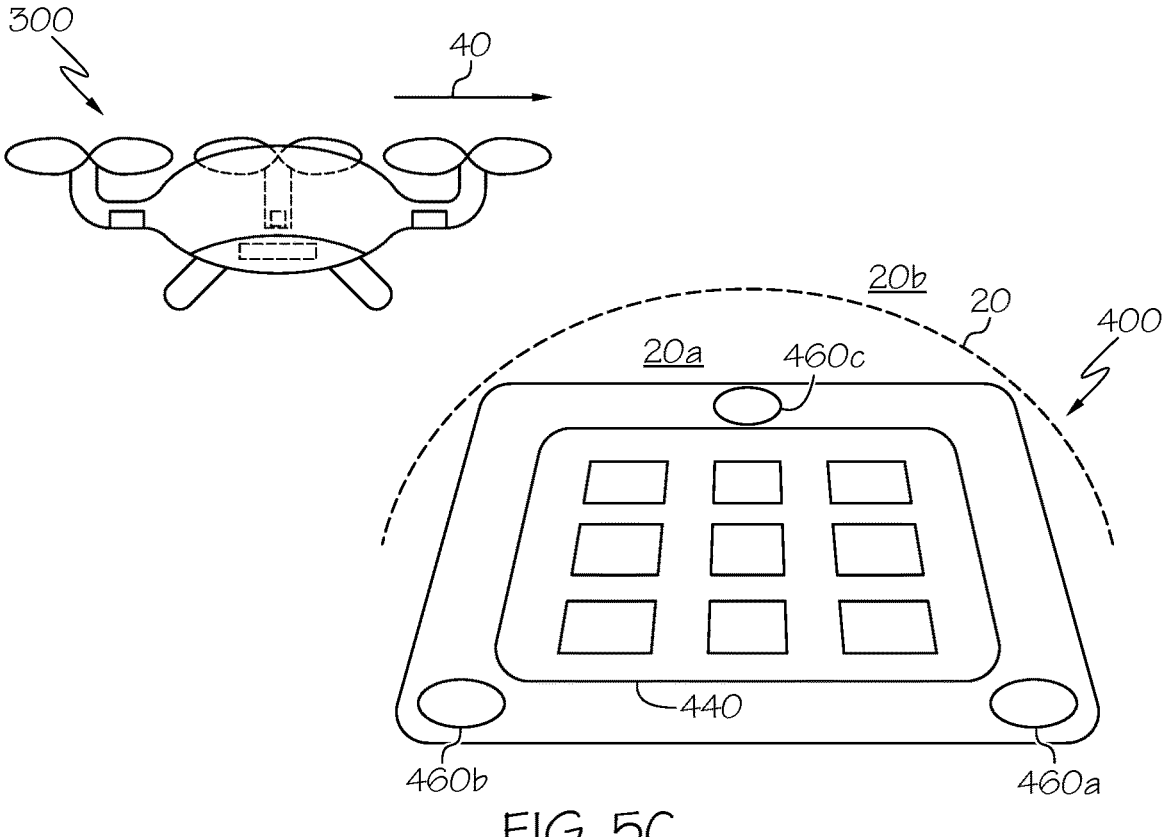
FIG. 5C schematically depicts the aerial vehicle approaching the power transmitter, according to one or more embodiments described and illustrated herein.

FIG. 5C depicts a moment that the aerial vehicle 300 approaches the charging station 400. When the aerial vehicle 300 approaches the charging station 400 (e.g., the distance between the aerial vehicle 300 and the charging station 400 decreases or decreases to a certain level), the charging station 400 may be automatically activated to start charging the aerial vehicle 300. As described above, the current change may be indicative of the distance change between the aerial vehicle 300 and the charging station 400. Therefore, when the current reaches a certain level, the charging station 400 may be automatically activated to start charging the aerial vehicle 300. Conversely, when the aerial vehicle moves away from the charging station (e.g., the distance between the aerial vehicle 300 and the charging station 400 increases or increases to a certain level) or when the current decreases to a certain level, the charging station 400 may be automatically deactivated and stop charging the aerial vehicle 300. The activation and deactivation of the charging station 400 may be similarly applied to the charging system of FIG. 1.

From the above, it is to be appreciated that defined herein is a system for charging an aerial vehicle is provided. The aerial vehicle includes a battery that is chargeable, and a receiver wirelessly receiving power to charge the battery. A charging station includes a transmitter wirelessly transmitting power to the receiver. A magnetic levitation module provides a repelling force between the aerial vehicle and the charging station. A controller controls the magnetic levitation module to adjust a level of the repelling force based on at least one of parameters indicative of charging efficiency.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An aerial vehicle, comprising:
a battery;
a receiver for wirelessly receiving power to charge the battery;
a plurality of vehicle magnetic levitation modules providing a repelling force between the aerial vehicle and a charging station, wherein the plurality of vehicle magnetic levitation modules generate a magnetic force depression that prevents lateral movement of the aerial vehicle; and
a controller controlling the plurality of vehicle magnetic levitation modules to adjust a level of the repelling force based on at least one parameter of a plurality of parameters indicative of charging efficiency and to control a movement of the aerial vehicle in a vertical direction by the repelling force.

2. The aerial vehicle of claim 1, wherein the plurality of parameters include a current level of the plurality of vehicle magnetic levitation modules.

3. The aerial vehicle of claim 1, wherein the controller increases or decreases the level of the repelling force such that to maintain the at least one parameter at a predetermined level.

4. The aerial vehicle of claim 1, wherein the controller activates a transmitter of the charging station to transmit power to the receiver when the at least one parameter indicates that the aerial vehicle is approaching the charging station.

5. A charging station for charging an aerial vehicle, comprising:
a transmitter wirelessly transmitting power to the aerial vehicle;
a plurality of transmitter magnetic levitation modules for providing a repelling force between the aerial vehicle and the charging station, wherein the plurality of transmitter magnetic levitation modules generate a magnetic depression that prevents lateral movement of the aerial vehicle; and
a controller controlling the plurality of transmitter magnetic levitation modules to adjust a level of the repelling force based on at least one parameter of a plurality of parameters indicative of charging efficiency and to control a movement of the aerial vehicle in a vertical direction by the repelling force.

6. The charging station of claim 5, wherein the plurality of parameters include a current level of the plurality of transmitter magnetic levitation modules.

7. The charging station of claim 5, wherein the controller increases or decreases the level of the repelling force such that to maintain the at least one parameter at a predetermined level.

8. The charging station of claim 5, wherein the controller activates the transmitter to transmit the power to the aerial vehicle when the at least one parameter indicates that the aerial vehicle is approaching the charging station.

9. A system for charging an aerial vehicle, comprising:
the aerial vehicle comprising:
a battery; and
a receiver for wirelessly receiving power to charge the battery;
a charging station comprising:
a transmitter wirelessly transmitting the power to the receiver;
a plurality of magnetic levitation modules providing a repelling force between the aerial vehicle and the charging station, wherein the plurality magnetic levitation modules generate a magnetic force depression that prevent lateral movement of the aerial vehicle; and
a controller controlling the plurality of magnetic levitation modules to adjust a level of the repelling force based on at least one parameter of a plurality of parameters indicative of charging efficiency and to control a movement of the aerial vehicle in a vertical direction by the repelling force, wherein the repelling force creates and maintains a vertical distance between the aerial vehicle and the charging station.

10. The system of claim 9, wherein the plurality of parameters include a current level of the plurality of magnetic levitation modules.

11. The system of claim 9, wherein the plurality of magnetic levitation modules is disposed on at least one of the aerial vehicle and the charging station.

12. The system of claim 9, wherein the controller increases or decreases the level of the repelling force such that to maintain the at least one parameter at a predetermined level.

13. The system of claim 9, wherein the controller activates the transmitter to transmit the power when the at least one parameter indicates that the aerial vehicle is approaching the charging station.

14. The system of claim 9, wherein the controller deactivates the transmitter to stop transmitting the power when the at least one parameter indicates that the aerial vehicle is moving away from the charging station.

* * * * *